United States Patent Office 3,062,808
Patented Nov. 6, 1962

3,062,808
PROCESS FOR PREPARING RIBONUCLEOSIDE-2',3'-CYCLIC PHOSPHATE
Kentaro Tanaka, Naruo, Naruo-cho, Nishinomiya-shi, Japan, assignor to Shionogi & Co., Ltd., Osaka-shi, Japan
No Drawing. Filed Feb. 12, 1960, Ser. No. 8,236
Claims priority, application Japan Feb. 18, 1959
3 Claims. (Cl. 260—211.5)

This invention relates to a process for preparing ribonucleoside-2',3'-cyclic phosphates from ribonucleic acid.

Ribonucleoside-2',3'-cyclic phosphates are known as intermediates in the ribonuclease-catalysed hydrolysis of ribonucleic acid and can be used, for example, as intermediates in the synthesis of Coenzyme A by the application of known methods (A. M. Michelson, J. Chem. Soc., 2055 (1958); J. G. Moffatt and H. G. Khorana, J. Am. Chem. Soc., 81, 1265 (1959)).

Some processes have heretofore been available for the preparation of the aforesaid cyclic phosphates, to wit: (1) the mild alkaline hydrolysis of ribonucleic acid (R. Markham and and J. D. Smith, Biochem. J., 52, 552 (1952)); (2) the reaction of ribonucleotides with trifluoroacetic anhydride (C.M. Brown, D. I. Magrath and A. R. Todd, J. Chem. Soc., 2708 (1952)); (3) the treatment of ribonucleic acid with potassium t-butoxide in anhydrous t-butyl alcohol (D. Lipkin and P. T. Talbart, Chem. and Ind., 143 (1955)); (4) the treatment of ribonucleotides with carbodiimides (M. Smith, J. G. Moffatt and H. G. Khorana, J. Am. Chem. Soc., 80, 6204 (1958)); and (5) the reaction of the tri-n-octylamine or tri-n-decylamine salts of ribonucleotides with tetraphenylphosphate or diphenylphosphorochloridate (A. M. Michelson, Chem. and Ind., 70 (1958)).

All of these methods can be carried out only with tedious and skillfur operations, with poor yields, or by the use of expensive agents from the available starting materials. There has been lacking, up to the present time, a simple method for producing the afore-said cyclic phosphates.

In accordance with the present invention, one can successfully obtain, in simple fashion and with good yields, ribonucleoside-2',3'-cyclic phosphates. This success can be achieved from the treatment of ribonucleic acid with liquid ammonia. The reaction can proceed by allowing ribonucleic acid with ammonia to stand in a sealed tube at room temperature. However, in this case, it takes a long time, more than 20 days for accomplishing the reaction and some oligonucleotides are by-produced. Therefore, it is preferable to carry out the reaction under heating and/or in the presence of a catalyst for accomplishing the reaction in a short time and obtaining ribonucleoside-2',3'-cyclic phosphates in good yields. When the reaction mixture is heated, the temperature is preferably to be kept at about 100° C. As a catalyst there may be used a substance having an alkali action in liquid ammonia medium, such as sodium amide and potassium amide. The use of a reaction solvent is not indispensable, but use may be made of an inactive solvent such as formamide for carrying out the reaction uniformly.

When no catalyst or no reaction solvent is used, the removal of liquid ammonia from the reaction mixture gives directly the products. But when catalyst or reaction solvent is used, the residue obtained by the removal of liquid ammonia may be treated with organic solvents such as a mixture of alcohol and ether and a mixture of ether and acetone to precipitate the products, and then the products may be collected by centrifugation.

The products are mixtures of some ribonucleoside-2',3'-cyclic phosphates, namely, adenosine-2',3'-phosphate, guanosine-2',3'-phosphate, cytidine-2',3'-phosphate and uridine-2',3'-phosphate, and besides include small amounts of by-products and unreacted ribonucleic acid according to the reaction condition. Each cyclic phosphate can be separated readily from the products obtained above both by paper and ion-exchange chromatography by established procedures.

The following examples are given by way of illustration only, and are not intended as a limitation on the scope of this invention. In fact, as many widely varying embodiments are possible without departing from the spirit and scope of the herein described invention, it is to be understood that this invention is to be limited by the specific wording of the appended claims only.

*Example 1*

The suspension of 200 mg. of dried yeast ribonucleic acid in 1 ml. of formamide was well mixed with 5 ml. of liquid ammonia in a sealed tube, and the mixture was heated for 3 hours in a boiling water bath. Practically no inorganic phosphorus compounds were liberated during the reaction. After completely removing ammonia from the reaction mixture, the products in the residual formamide solution were precipitated by adding 20 ml. of dried acetone and 30 ml. of dried ether. The precipitate thus obtained was a mixture of ribonucleoside-2',3'-cyclic phosphates containing a small amount of by-products.

The separation of the cyclic phosphates was easily effected by subjecting the formamide solution to paper chromatography in ammonia atmosphere using 70% (by volume) aqueous isopropanol as solvent. Three main spots corresponding to adenosine-2',3'-phosphate (spot $a$), a mixture of cyclic pyrimidine nucleotides (spot $b$), and guanosine-2',3'-phosphate (spot $c$), together with two faint spots probably due to 2'- or 3'-nucleotides, were detected on the chromatogram.

These spots were separately eluted with water and their identity was confirmed as follows: (1) Paper chromatographic analysis of the base component in each eluate by the method of Smith et al. (J. D. Smith and R. Markham) gave relevant results. (2) While the eluate from spot $b$ was completely digested by pancreatic ribonuclease to give ordinary pyrimidine nucleotides (3'-nucleotides), the same treatment failed to alter the Rf values of the other spots in two different solvent systems. (3) The eluates from spots $a$, $b$ and $c$ were converted to corresponding ordinary mononucleotides (2'- and 3'-nucleotides) by the hydrolysis with 0.1 N HCl for 4 hours at room temperature or with N NaOH for 1 hour at 100° C. In the case of adenosine-2',3'-phosphate and guanosine-2',3'-phosphate (spots $a$ and $c$, respectively), it was possible to separate the hydrolysis products into 2'- and 3'-nucleotides by paper chromatography using a mixture of saturated $(NH_3)_2SO_4$, N sodium acetate, and isopropanol as solvent. (4) No inorganic phosphorus was released from the ammonia degradation product of ribonucleic acid by seminal phosphomonoesterase, unless the sample was pretreated with 0.1 N HCl as described above.

From the absorbency at 260 m$\mu$, the yield of ribonucleoside-2',3'-cyclic phosphates was estimated to be 76–82%.

*Example 2*

To 500 mg. of yeast ribonucleic acid, about 20 ml. of liquid ammonia was introduced and the mixture was kept in a sealed tube at room temperature for one month. During this period, the tube was shaken frequently. As the reaction proceeded, the yeast ribonucleic acid became very sticky and the liquid phase turned to yellow. At the end of the period, ammonia was distilled off and the residue was evacuated by vacuum pump to remove ammonia completely. The products are ribonucleoside-2',3'-cyclic phosphates contaminated with oligonucleotides.

Example 3

The suspension of 500 mg. of yeast ribonucleic acid in 5 ml. of formamide was well mixed with 20 ml. of liquid ammonia and sodium amide prepared from 0.1 g. of metallic sodium in a sealed tube for 0.5–1 hour. In order to decompose sodium amide, the solution of ammonium chloride in liquid ammonia was added to the reaction mixture. After completely removing off ammonia and filtering off sodium chloride, a mixture of alcohol and ether was added to the residual formamide solution. The precipitate was collected by filtration to give 340 mg. of ribonucleoside-2′,3′-cyclic phosphates.

What is claimed is:

1. A process for preparing ribonucleoside-2′,3′-cyclic phosphate, which comprises treating ribonucleic acid with liquid ammonia under anhydrous conditions at a temperature from ambient to about 100° C. in the presence in the liquid ammonia of a catalyst having an alkaline action in liquid ammonia, and isolating resultant ribonucleoside-2′,3′-cyclic phosphate.

2. A process for preparing ribonucleoside-2′,3′-cyclic phosphate, which comprises heating ribonucleic acid with liquid ammonia under anhydrous conditions at about 100° C., evaporating liquid ammonia from the reaction mixture, and then treating the residue with an organic solvent to separate resultant ribonucleoside-2′, 3′-cyclic phosphate.

3. A process for preparing ribonucleoside-2′, 3′-cyclic phosphate, which comprises treating ribonucleic acid with liquid ammonia under anhydrous conditions at a temperature from ambient to about 100° C. in the presence of sodium amide, and isolating resultant ribonucleoside-2′, 3′-cyclic phosphate.

References Cited in the file of this patent

UNITED STATES PATENTS 2,719,844     Dimroth _____ Oct. 4, 1955